United States Patent
Lutz (10) Patent No.: US 11,892,831 B2
(45) Date of Patent: Feb. 6, 2024

(54) EXTENDED TREND INDICATOR FOR PROCESS DATA AND SECONDARY ALARMS

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 32 days.

(21) Appl. No.: 17/762,561

(22) PCT Filed: Sep. 16, 2020

(86) PCT No.: PCT/EP2020/075820
§ 371 (c)(1),
(2) Date: Mar. 22, 2022

(87) PCT Pub. No.: WO2021/058344
PCT Pub. Date: Apr. 1, 2021

(65) Prior Publication Data
US 2022/0342409 A1    Oct. 27, 2022

(30) Foreign Application Priority Data

Sep. 23, 2019 (EP) ..................... 19198967

(51) Int. Cl.
*G05B 23/02* (2006.01)
(52) U.S. Cl.
CPC ....... *G05B 23/0272* (2013.01); *G05B 23/024* (2013.01); *G05B 23/0254* (2013.01)
(58) Field of Classification Search
None
See application file for complete search history.

(56) References Cited

U.S. PATENT DOCUMENTS

| | | | |
|---|---|---|---|
| 7,389,204 B2 * | 6/2008 | Eryurek | G05B 23/0272 340/506 |
| 2004/0113912 A1 | 6/2004 | Brooks et al. | |

(Continued)

FOREIGN PATENT DOCUMENTS

| | | |
|---|---|---|
| DE | 102012110132 | 4/2013 |
| DE | 102017219549 | 5/2019 |
| EP | 3093770 | 11/2016 |

OTHER PUBLICATIONS

PCT International Search Report dated Dec. 21, 2020 based on PCT/EP2020/075820 filed Sep. 16, 2020.

*Primary Examiner* — Carlos R Ortiz Rodriguez
(74) *Attorney, Agent, or Firm* — Cozen O'Connor (57) ABSTRACT

Industrial technical plant controlled and monitored by a process control, wherein a visualization system requests a history of selected process datum for that display period from a process control system and outputs the associated profile as a graphic forming process data points, where the visualization system determines the particular process data point as the average or median of the values of the selected process datum in a collection period characteristic of the particular process data point and where, for the particular process data point, the visualization system also determines the minimum and/or the maximum values of the selected process datum during the collection period such that whenever the minimum is below a predefined minimum value and/or the maximum exceeds a predefined maximum value, the visualization system indicates, together with the particular process data point, a secondary alarm not set by the process control system, but set by the visualization system.

9 Claims, 9 Drawing Sheets

(56) References Cited

U.S. PATENT DOCUMENTS

2013/0100136 A1    4/2013   Van Camp et al.
2016/0299966 A1   10/2016   Dhollander et al.
2017/0248942 A1    8/2017   Sudo et al.

\* cited by examiner

FIG 7

EXTENDED TREND INDICATOR FOR PROCESS DATA AND SECONDARY ALARMS

CROSS-REFERENCE TO RELATED APPLICATIONS

This is a U.S. national stage of application No. PCT/EP2020/075820 filed 16 Sep. 2020. Priority is claimed on European Application No. 19198967.2 filed 23 Sep. 2019, the content of which is incorporated herein by reference in its entirety.

BACKGROUND OF THE INVENTION

1. Field of the Invention

The present invention relates to industrial automation systems and, more particularly, to a visualization method for process data by a visualization system, where an industrial technical installation is controlled and monitored by a process control system, where the process control system at acquisition points in time in each case acquires the process data and the process data that is acquired is archived as a history where, owing to the selection of an item of process data and the specification of an associated display period of time by at least one operator of the process control system for the predetermined display period of time, the visualization system requests the history of the selected item of process data and outputs the associated temporal curve as a graphic to the at least one operator where the graphic comprises a number of process data points, where the visualization system determines the respective process data point with reference to the values of the selected item of process data of a respective acquisition period of time that is characteristic for the respective process data point, and where the respective process data point is a mean value or a median value of the process data of the respective acquisition period of time.

The present invention also relates to a computer program for a visualization system, where the computer program comprises machine code that can be processed by the visualization system where, owing to the processing of the machine code owing to the selection of an item of process data and the specification of an associated display period of time by at least one operator of a process control system that controls and monitors an industrial technical installation and that acquires the item of process data at acquisition points in time and in each case archives the item of process data as a history for the predetermined display period of time, the visualization system requests the history of the selected item of process data and outputs the associated temporal curve as a graphic to the at least one operator, where the graphic comprises a number of process data points where, owing to the processing of the machine code, the visualization system determines the respective process data point with reference to the values of the selected item of process data of a respective acquisition period of time that is characteristic for the respective process data point, and where the respective process data point is a mean value or a median value of the process data of the respective acquisition period of time.

The present invention furthermore relates to a visualization system, where the visualization system is programmed using a computer program of this type with the result that during operation the visualization system implements the above-described method steps in conjunction with the computer program.

The process data can be, for example, actual variables or desired variables of a controller. The mean value can alternatively be a weighted or an unweighted mean value. The median value can be in particular an xx-%-median value, wherein xx is a suitable value.

So-called process object views are of great importance for the operation and monitoring of processing plants. So-called block symbols for the process objects are integrated into associated installation images and these block symbols, in addition to an important process value, also graphically represent different status information, such as process alarms or simulation results. Based on the block symbols, it is also possible to open views for the process objects and the views, in addition to the pure monitoring of a process object, also render possible the operation of the process object. Based on views of this type, it is possible to open further views, such as trend curves or an alarm view with the process alarms that are relevant for the respective process object. Trend curves usually display the curve of a respective process value as a function of time. Process alarms are usually represented in the form of a message sequence display, in other words in the form of a chronological list of the process alarms that have occurred in each case. The display of a trend curve, in other words the temporal curve of the process data points that are determined, corresponds to the prior art on which the scope of the present invention is based.

2. Description of the Related Art

In the prior art, approaches are also known for augmenting trend curves using suitable information regarding secondary alarms. Secondary alarms are alarms that are set not by the process control system but rather are set by the visualization system. In the case of a secondary alarm, the visualization system checks whether the determined mean value or median value meets a condition that is set by the operator for the respective process data point. If, in a purely exemplary manner, a process alarm is triggered, as soon as an item of process data exceeds the value x, then the operator can, for example, set that a secondary alarm is displayed if the value that is determined for the respective process data point exceeds the value y, where the value y resides to a sufficient extent below the value x. It is possible to take a similar approach if checked check must be performed to establish whether the value that is determined for the respective process data point is below a value z. In the case of a secondary alarm, it is possible, for example, to highlight in color the corresponding region of the trend curve.

The approach that is mentioned leads to good results, provided the display period of time set by the operator is sufficiently small, so that the number of process data points is at least as large as the amount of process data that is acquired during the display period of time. However, generally speaking, the operator specifies the display period of time such that the number of process data points is smaller than the amount of process data that is acquired during the display period of time, often considerably smaller. Here, it is possible that, on account of the formation of the mean value or the formation of the median value and the smoothing that is associated herewith, it is no longer possible that the process data that is acquired during a specific acquisition period of time exceeds the value y or is below the value z once or multiple times. To a yet greater extent, this poses a problem if in the future targeted predictions are made owing to the trend curves. Also predictions of this type are distorted to a considerable extent by the smoothing that is associated with the formation of the mean value or the formation of the median value.

SUMMARY OF THE INVENTION

It is an object of the present invention to provide a visualization method that makes it possible for an operator to be able to reliably evaluate a trend curve, where predictions are to be as reliable as possible.

This and other objects and advantages are achieved in accordance with the invention by a visualization method in which a visualization system also determines for the respective process data point the minimum and/or the maximum of the values of the selected item of process data during the respective acquisition period of time and in which the visualization system always then displays a secondary alarm together with the respective process data point if the minimum that is determined for the respective process data point is below a predetermined minimum value and/or the maximum that is determined exceeds a predetermined maximum value.

Owing to the additional determination of the minimum and/or the maximum and based on this the determination of the secondary alarm, it is no longer possible in particular for a secondary alarm to no longer be identified on account of a formation of the mean value or formation of the median value over an acquisition period of time that is too large and therefore too much process data.

It is preferred that the visualization method is implemented such that the process data is allocated within the process control system to a respective process object, such that the process control system in each case automatically sets a process alarm if the process data that is allocated to the respective process object meets a predetermined triggering condition, such that the process control system for each process object at the acquisition points in time also detects the process alarms that are currently set and archives or stores the detected process alarms in the sense of the mentioned history, such that the visualization system together with the history of the selected item of process data for the same display period of time also requests the history of the process alarms that are allocated to the respective process object and such that the visualization system always then displays the process data points together with the respective process data point of at least one of the process alarms if at least one process alarm occurs during the acquisition period of time that is allocated to the respective process data point.

Owing to the display of the process alarm, it is immediately apparent for the operator if a process alarm occurs during the respective acquisition period of time. The predetermined triggering condition can be met, for example, if one of the object variables exceeds or is below a specific predetermined value.

The display period of time can then comprise, for example, the present if the operator specifies the content "display to me the item of process data x for the last y minutes" or a comparable specification. The use of the predicted minima and/or maxima when predicting the secondary alarms also improves the determination of the predicted secondary alarms.

It is preferred that the visualization system furthermore always then displays a predicted process alarm together with the respective predicted process data point if the respective predicted minimum and/or the respective predicted maximum meets the predetermined triggering condition. As a consequence, it is possible for the operator to more reliably than in the prior art identify whether and when there is a specific risk of a process alarm.

It is preferred that the visualization system displays the determined minima and/or the determined maxima owing to an operator input of the at least one operator together with the process data points and suppresses the display of the determined minima and/or the determined maxima owing to the at least one operator providing an operator input that is inverse in this regard. As a result, the operator can, as required, overlay the determined minima and/or the determined maxima into the determined trend curve or hide them from the determined trend curve.

It is also an object of the invention to provide a computer program such that, owing to the processing of the machine code, the visualization system also furthermore determines the minimum and/or the maximum of the values of the selected item of process data for the respective process data point during the respective acquisition period of time and always then displays a secondary alarm together with the respective process data point if the minimum that is determined for the respective data point is below a predetermined minimum value and/or the determined maximum exceeds a predetermined maximum value.

The advantages that are achieved as a consequence correspond to the advantages of the visualization method. Furthermore, the advantageous embodiments of the computer program also correspond to the advantageous embodiments of the visualization method. The same applies for the advantages that are achieved in each case for the respective advantageous embodiments.

It is also an of the invention to provide a visualization system, where the visualization system is programmed using a computer program provided on a non-transitory computer-readable medium in accordance with the invention with the result that the visualization system additionally also implements the method steps in accordance with the invention of the computer program in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described characteristics, features and advantages of this invention and also the manner in which these are achieved become clearer and more explicitly understandable in conjunction with the following description of the exemplary embodiments that are further explained in conjunction with the drawings, in which.

DETAILED DESCRIPTION OF THE EXEMPLARY EMBODIMENTS

Figure 1:
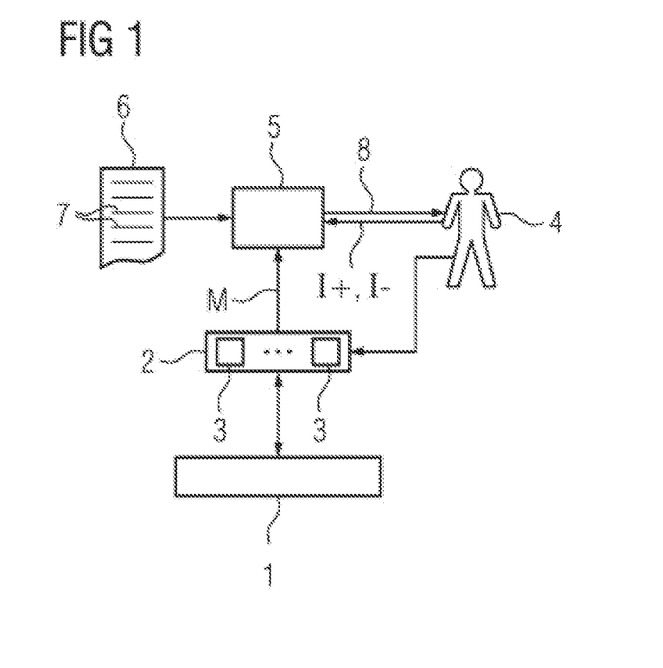
FIG. 1 shows an schematic overview of an installation in accordance with the invention.

In accordance with FIG. 1, an industrial technical installation 1 is controlled and monitored by a process control system 2. The industrial technical installation 1 can be, for example, a processing plant. It is also possible for it to be another installation. The process control system 2 comprises control facilities for individual parts of the industrial technical installation 1. The effect of the control facilities on the respective part of the industrial technical installation 1 and the interaction of the control facilities with one another is guided by superordinate computers.

So-called process objects 3 are known to the process control system 2. The process objects 3 can, for example, be set within the scope of project planning of the process control system 2. An example of a process object 3 is a controller that controls a variable of the industrial technical installation 1. There are, however, other process objects 3.

Figure 2:
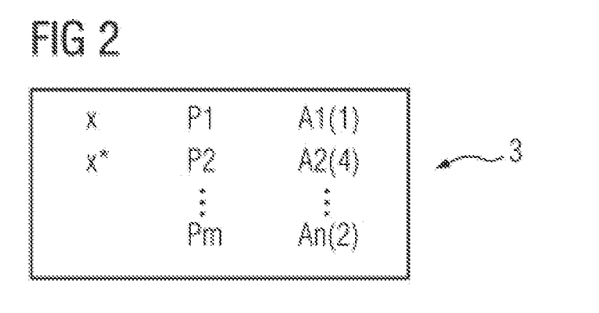
FIG. 2 shows a schematic illustration of a process object in accordance with the invention.

Within the process control system 2, in each case process data x, x*, Pi (i=1, 2, . . . m) is allocated to the process objects 3 according to the illustration in FIG. 2. The process data x, x*, Pi can be actual variables x, desired variables x*, parameters Pi of a controller and more of the like. For example, in the case of a PI controller, the parameters Pi can be the proportional amplification, the reset time and the absolute value of the maximum output variable of the controller. The allocation of the respective process data x, x*, Pi to the process objects 3 is also known to the process control system 2.

In general, process alarms Aj (j=1, 2, . . . n) can be furthermore allocated to the process objects 3 in accordance with the illustration in FIG. 2. Here, the allocation of the respective process alarms Aj is also known to the process control system 2. The process alarms Aj each have a priority. The respective priority in FIG. 2 is set in a purely exemplary manner after the respective process alarm Aj in brackets.

The process control system 2 implements a control and monitoring method that is further explained below in conjunction with FIG. 3.

Figure 3:
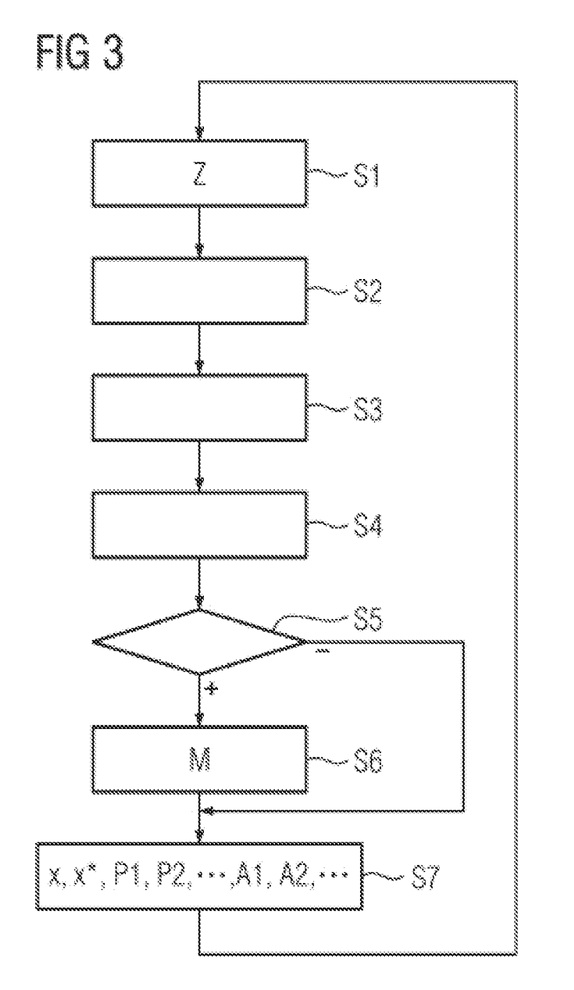
FIG. 3 shows a flow chart in accordance with the invention.

In accordance with FIG. 3, in step S1 the process control system 2 accepts a prevailing state Z of the industrial technical installation 1. The prevailing state Z particularly comprises the actual variables x of the controller. In step S2, the process control system 2 accepts the inputs from an operator 4 (cf. FIG. 1). The inputs can comprise specifications for the process objects 3, such as new desired variables x* for the controller or a change of parameters Pi of the controller. The term "operator" is used within the scope of the present invention in a generic sense. It is possible to be one individual operator or multiple people.

In step S3, the process control system 2 determines control variables for the industrial technical installation 1. When the control variables are determined, the process control system 2 utilizes the process data x, x*, Pi that is allocated to the individual process objects 3. In step S4, the process control system 2 outputs the determined control variables to the industrial technical installation 1 and consequently controls the industrial technical installation 1.

Provided that the process control system 2, as is generally customary, also sets process alarms, the process control system 2 checks in step S5 for whether a triggering condition is met for a process alarm Aj. The check is performed by the process control system 2 individually for each process object 3 and within the respective process object 3 individually for each process alarm Aj. The answer to the question as to whether the respective triggering condition is met or not is decided by the process control system 2 with reference to the process data x, x*, Pi that is allocated to the respective process object 3. The triggering condition can be met, for example, if an item of process data x, x*, Pi of the corresponding process object 3 (in particular an actual value x) exceeds a specific predetermined value or is below the specific predetermined value or if specific value combinations are provided or other derived values are below specific limits or exceed the specific limits.

If the triggering condition is met, then the process control system 2 in step S6 automatically sets the corresponding process alarm Aj and transmits a corresponding alarm notification M to a visualization system 5 including a processor and memory (cf. FIG. 1). Otherwise, if in other words the triggering condition is not met, then step S6 is skipped.

In step S7, the process control system 2 archives at least the process data x, x*, Pi. In general, in step S7 the process control system 2 also archives the process alarm Aj that is currently set. The archiving is performed in the sense of a history. In other words, the respective acquisition point in time is firstly allocated to the respectively archived values x, x*, Pi, Aj. Furthermore, the values that are already archived are not overwritten. On the contrary, the values that are to be newly archived join the values that are already archived so that both the values that are to be newly archived as well as the values that are already archived are available at later points in time for evaluations.

The approach of FIG. 3 is repeated cyclically again and again. From step S7, the process control system 2 consequently moves back to step S1. The cyclical repetition is even usually performed with a fixed cycle.

The visualization system 5 is programmed using a computer program 6 provided on a non-transitory computer-readable medium, where the computer program 6 comprises machine code 7 that can be processed by the visualization system 5. Owing to the processing of the machine code 7, the visualization system 5 implements (inter alia) a visualization method that is further explained below in conjunction with FIG. 4.

Figure 4:
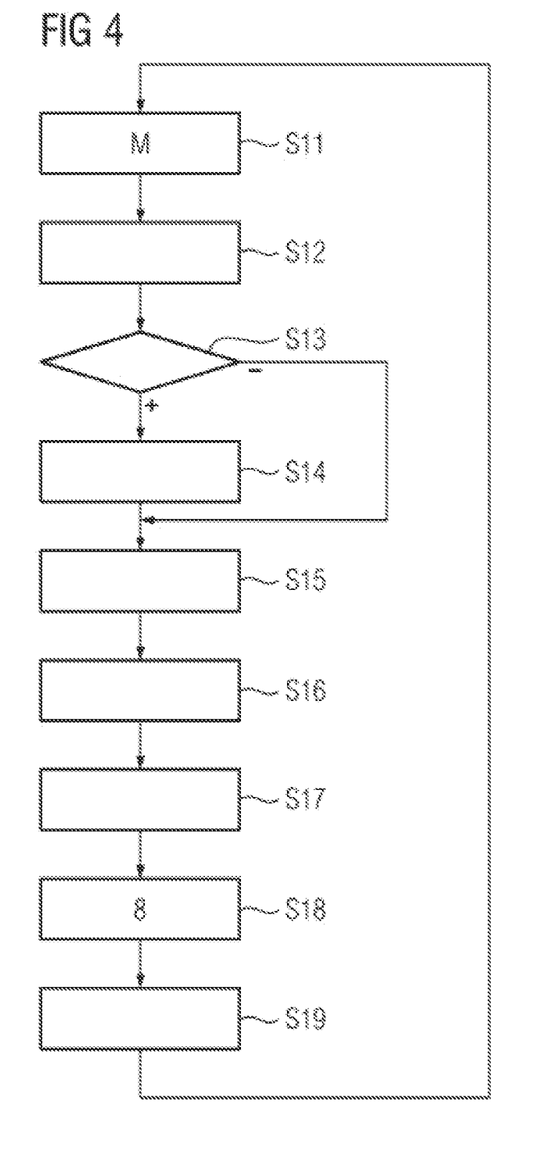
FIG. 4 shows a flow chart in accordance with an embodiment of the invention.

In step S11, the visualization system 5 accepts the alarm notifications M that are transmitted by the process control system 2. In step S12, the visualization system 5 outputs the corresponding process alarms Aj (more precisely: corresponding notifications) to the operator 4. The output of the respective process alarm Aj to the operator 4 can be performed, for example, by a visual display. Where applicable, the visual display can be supported by an acoustic notification. In step S13, the visualization system 5 checks for whether it has received an acknowledgement from the operator 4 for the respective process alarm Aj. As long as this is not the case, the visualization system 5 skips a step S14. Conversely, if the visualization system 5 has received an acknowledgement from the operator 4 for the corresponding process alarm Aj, then the visualization system 5 terminates the output of the respective process alarm AJ to the operator 4 in step S14.

Although steps S11 to S14 as such are generally provided, within the scope of the basic principle of the current invention they are of subordinate meaning.

In step S15, the visualization system 5 accepts a selection of an item of process data x, x*, Pi from the operator 4. In step S15, in principle the operator 4 can select an arbitrary item of process data x, x*, Pi. Often, it is however an actual value x. In step S15, the visualization system 5 furthermore accepts a display period of time from the operator 4. The display period of time is set by the operator 4. As a consequence, it is not known in advance from the point of view of the visualization system 5 which variable the display period of time possesses. From the point of view of the visualization system 5, the display period of time can consequently be arbitrary in principle.

In step S16, the visualization system 5 requests at least the history of the selected item of process data x, x*, Pi from the process control system 2 for the predetermined display period of time. In general, in step S16 the visualization system 5, at the same time, also requests from the process control system 2 the history of the process alarms Aj that are allocated to the respective process object 3 for the same display period of time. In step S17, the visualization system 5 accepts from the process control system 2 the requested process data x, x*, Pi and where applicable also the requested process alarms Aj.

Figure 5:
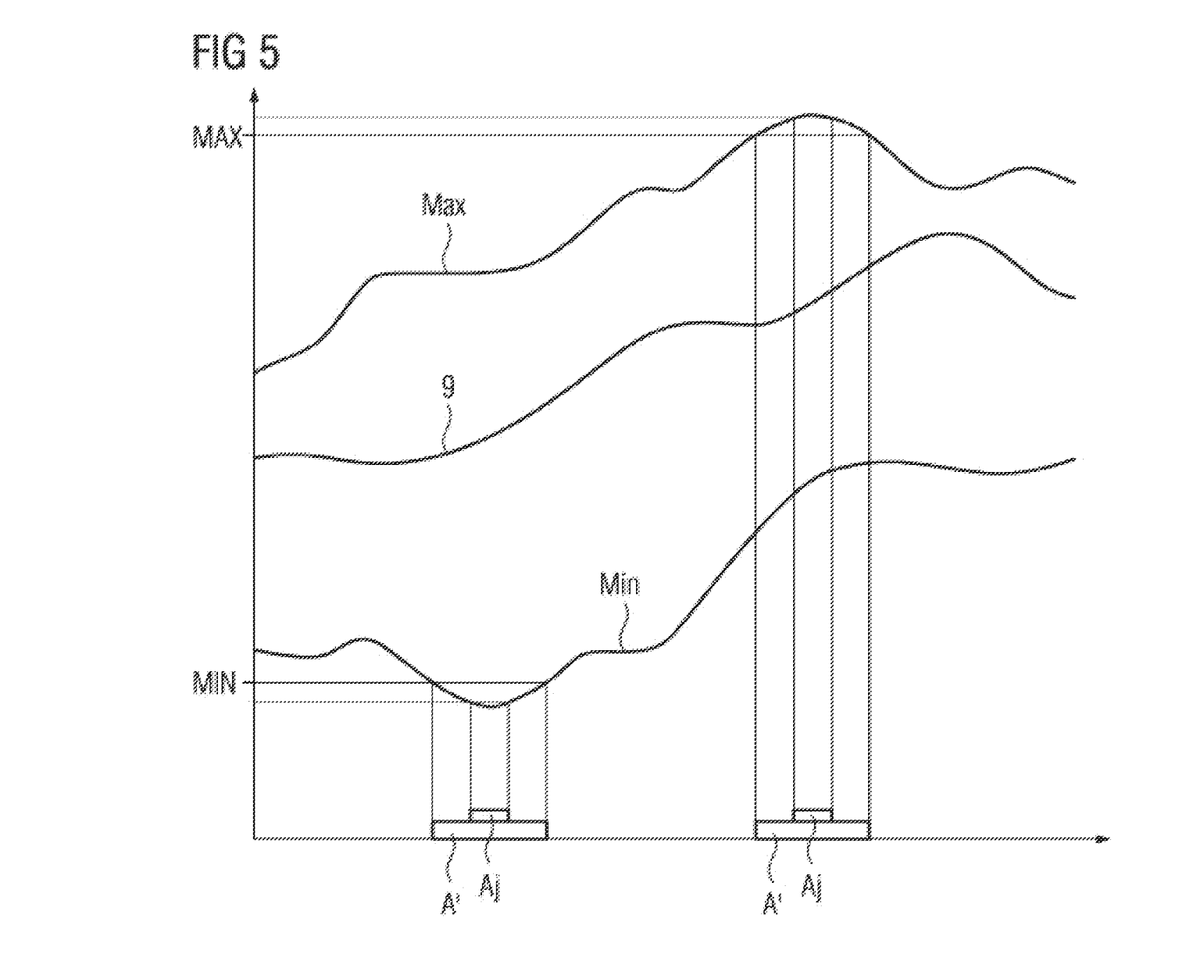
FIG. 5 shows a graphical plot of temporal curve of an item of process data and a graphic in accordance with the invention.

In step S18, the visualization system 5 determines a graphic 8 (cf. FIG. 1 and FIG. 5). The graphic 8 for the predetermined display period of time represents the temporal curve of the selected item of process data x, x*, Pi. It is possible to allocate secondary alarms A' to the process data points 9. The secondary alarms A' are likewise determined in step S18. Step S18 is explained in detail in conjunction with FIG. 6. The visualization system 5 outputs the graphic 8 to the operator 4 in step S19.

Figure 6:
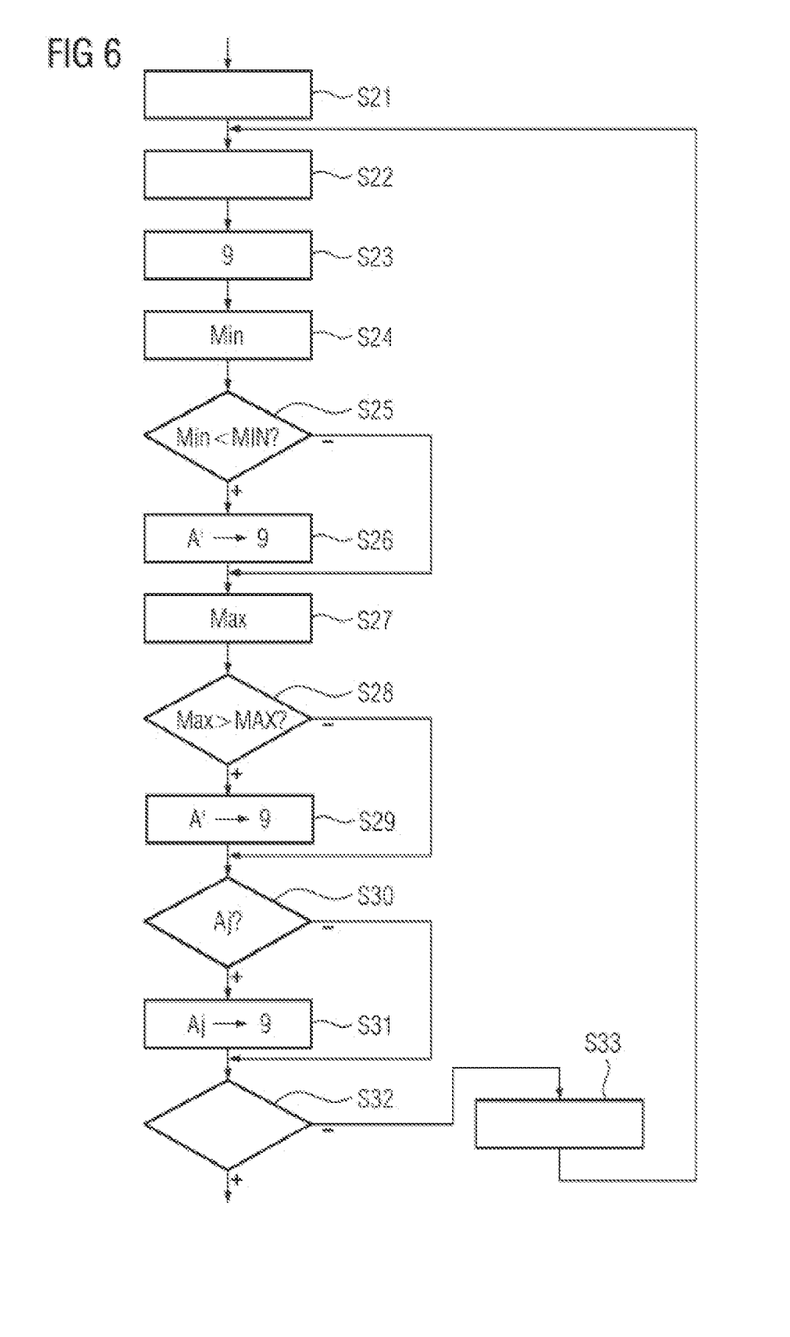
FIG. 6 shows a flow chart in accordance with a further embodiment of the invention.

In accordance with FIG. 6, in step S21, the visualization system 5 initially selects a first process data point 9 (cf. FIG. 5) so as to determine the graphic 8. In step S22, the visualization system 5 determines an associated acquisition period of time for the selected process data point 9. The respective acquisition period of time can comprise multiple acquisition points in time. If, for example, the graphic 8 can comprise a maximum 200 process data points 9, but during the entire display period of time 10,000 times the process data x, x*, Pi and where applicable also the process alarms Aj have been acquired, it is inevitably necessary for each process data point 9 to jointly utilize the process data x, x*, Pi and where applicable also the process alarms Aj of multiple acquisition points in time in order to determine the respective process data point 9.

In step S23, the visualization system 5 subsequently determines the associated value of the selected process data point 9 with reference to the values of the selected item of process data x, x*, Pi that are archived in this acquisition period of time. For example, the visualization system 5 can use, as a corresponding value, the unweighted mean value (in other words the sum of the values divided by the number of values) or the weighted mean value (in other words the sum of the values that are weighted with a respective weighting factor divided by the sum of the weighting factors) of the values of the selected item of process data x, x*, Pi. Alternatively, the value of the respective process data point 9 can be determined, for example, by a median value. The median value can be, in particular, an xx-%-median value, where xx is a suitable value between 0 and 100 (limits not included). Usually, the value of xx lies between 40 and 60.

In step S24, the visualization system 5 subsequently determines the minimum Min of the values of the selected item of process data x, x*, Pi that are archived in this acquisition period of time. In step S25, the visualization system 5 checks whether the determined minimum Min is below a minimum value MIN. If this is the case, in step S26 the visualization system 5 allocates a secondary alarm A' to the process data point 9. Otherwise, step S26 is skipped. The minimum value MIN can be set, for example, by the operator 4. In particular, the minimum value MIN can be selected such that, in the case of an item of process data x, x*, Pi that is becoming ever smaller, the secondary alarm A' is triggered prior to the corresponding process alarm Aj.

In step S27, the visualization system 5 subsequently determines the maximum Max of the values of the selected item of process data x, x*, Pi that are archived in this acquisition period of time. In step S28, the visualization system 5 checks whether the determined maximum Max exceeds a maximum value MAX. If this is the case, in step S29 the visualization system 5 likewise allocates a secondary alarm A' to the process data point 9. Otherwise, step S29 is skipped. The maximum value MAX can be set, for example, by the operator 4. In particular, the maximum value MAX can be selected n such that, in the case of an item of process data x, x*, Pi that is growing ever larger, the secondary alarm A' is triggered prior to the corresponding process alarm Aj.

In step S30, the visualization system 5 checks whether a process alarm Aj is allocated to the process data x, x*, Pi. If this is the case, in step S31 the visualization system 5 then allocates one of the process alarms Aj to the process data point 9. In general, in step S31 the process alarm Aj is allocated with the highest priority. If a process alarm Aj is not allocated to the process data x, x*, Pi, then step S31 is skipped.

In step S32, the visualization system 5 checks whether it has already performed the steps S22 to S31 for all the process data points 9. If this is not the case, then the visualization system 5 transfers to a step S33 in which the visualization system 5 selects the next process data point 9. The visualization system 5 subsequently returns to step S22. Otherwise, the approach of FIG. 6 is terminated.

An approach was described above in which both steps S24 to S26 as well as steps S27 to S29 as well as steps S30 and S31 are available. Embodiments are, however, likewise also possible in which only steps S24 to S26 and steps S27 to S29 or only steps S24 to S26 and steps S30 and S31 or only steps S27 to S29 and steps S30 and S31 are available. Embodiments are likewise also possible in which only steps S24 to S26 or only steps S27 to S29 are available.

The graphic 8 consequently comprises a number of process data points 9. FIG. 5 illustrates, on the one hand, the curve of the process data points 9. FIG. 5 furthermore illustrates the curve of the determined minima Min and the curve of the determined maxima Max. Furthermore, the determined secondary alarms A' and the allocated process alarms Aj are marked in FIG. 5.

It is possible that the graphic 8 is output to the operator 4 in the manner as is illustrated in FIG. 5. Here, on the one hand, the temporal curve of the process data points 9 and the secondary alarms A' are displayed. On the other hand, insofar as it is determined, the temporal curves of the determined minima Min and the determined maxima Max are also displayed. Where applicable, the process alarms Aj are also displayed. In this context, it is recalled that although the process alarms Aj are displayed in general, within the scope of the present invention, however, they are of subordinate meaning. The advantage of the illustration in accordance with FIG. 5 lies in particular in the fact that in the case that the acquisition period of time of a respective process data point 9 comprises multiple acquisition points in time, with reference to the data value of the respective process data point 9 it is often no longer apparent whether, and where applicable, why a specific process alarm Aj has been triggered or a secondary alarm A' has been determined. Owing to the manner in which data is displayed, as just explained, the information regarding why this is the case and at which positions the operator must request a refined display of process data x, x*, Pi is, however, conveyed to the operator 4 to obtain complete information.

Figure 7:
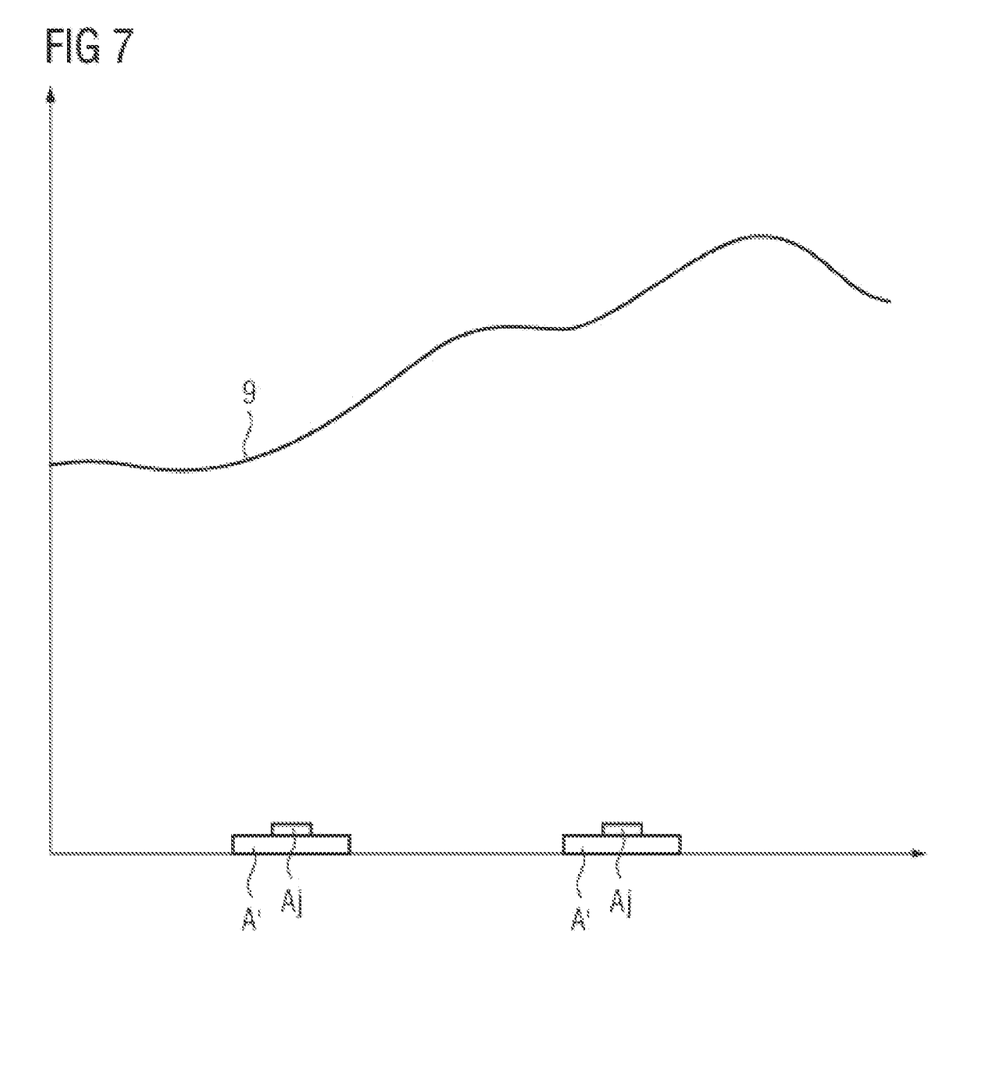
FIG. 7 shows a graphical plot of a temporal curve of an item of process data and a graphic in which only the temporal curve of the process data points and the secondary alarms are displayed in accordance with the invention.

It is possible that the graphic 8 is always output to the operator 4 according to the illustration in FIG. 5. It is, however, likewise possible that the operator 4 can specify to the visualization system 5 an operator input I+ or an operator input I− that is inverse in this regard corresponding to the illustration in FIG. 1. If the operator 4 specifies the operator input I+, then the output corresponding to the illustration in FIG. 5 is therefore provided. If the operator 4 conversely specifies the inverse operator input I−, then the output corresponding to the illustration in FIG. 7 is therefore provided. In accordance with the illustration of FIG. 7, only the temporal curve of the process data points 9 and the secondary alarms A' are displayed (where applicable in addition to the process alarms Aj). The temporal curves of the determined minima Min and/or the determined maxima Max are conversely not displayed. In other words, when required, the operator 4 can overlay the display of the temporal curves of the determined minima Min and the determined maxima Max into the display of the process data points 9 or can hide the determined minima and maxima from the display of the process data points 9. Where applicable, the overlaying or hiding can also be performed individually for the minima Min and the maxima Max.

The advantage of hiding particularly resides in the fact that the secondary alarms A' are still correctly determined and therefore the information regarding at which sites they must request a refined display of process data x, x*, Pi is still conveyed to the operator 4 in order to obtain complete information. The actual trend, in other words the temporal curve of the process data points 9 is, however, more apparent.

Owing to the fact that the display period of time is specified by the operator 4, it is furthermore also possible that the predetermined display period of time comprises the present. For example, the operator 4 can specify to the visualization system 5 that the display period of time is to extend from a point in time that lies in the past, however, apart from that can be arbitrarily selected in principle (for example, after a specific time) until "now" or that the display period of time is to extend from "now" for a specific time span (for example, 10 minutes or 3 hours) into the past. If this is the case, in other words the present is included, the approach in accordance with the invention is preferably supplemented by the approach that is explained below in conjunction with FIG. 8.

Figure 8:
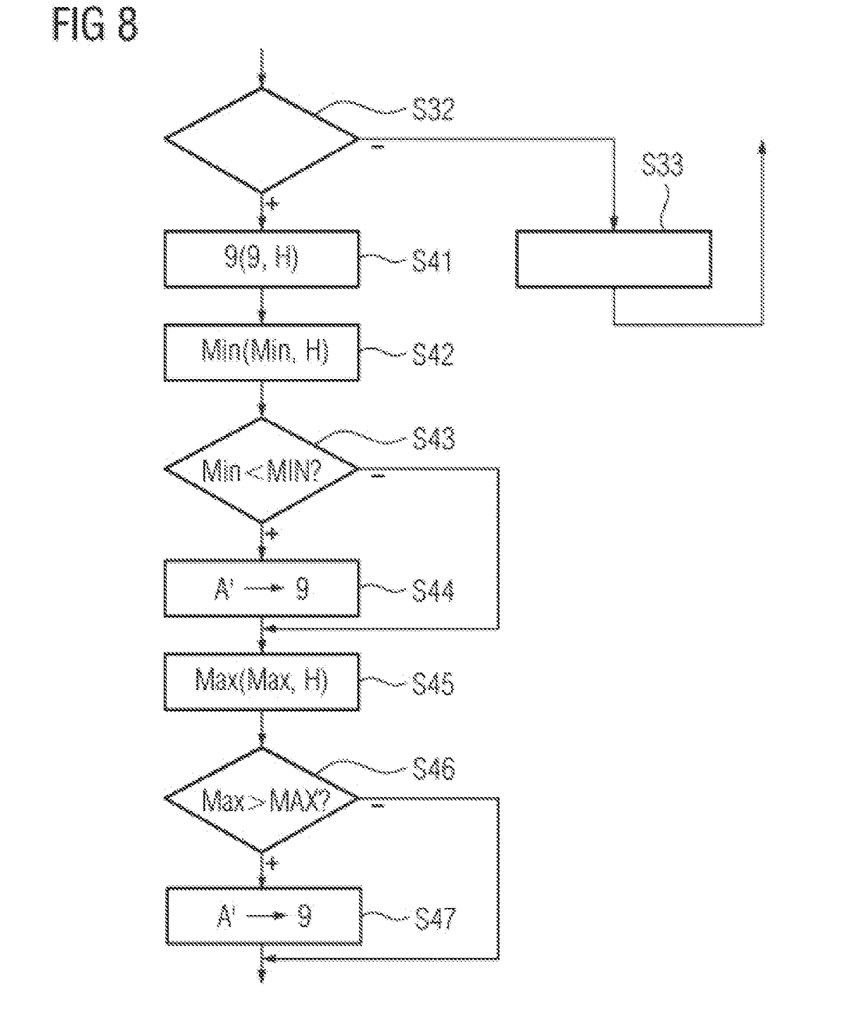
FIG. 8 shows a flow chart in accordance with an additional embodiment of the invention.

FIG. 8 builds on the approach of FIG. 6. Steps S41 to S47 are additionally provided. In step S41, the visualization system 5 determines a prediction of the future curve of the process data points 9 with reference to the determined process data points 9, in other words with reference to the process data points 9 that are determined for the display period of time. The determination of the prediction can also be provided as in the prior art. It is therefore not necessary to further go into the details of the determination.

The prediction is provided for a prediction horizon H. The prediction horizon H in accordance with FIG. 9 reaches from the present into the future. It is possible that the extent to which the prediction horizon H extends into the future is fixedly specified to the visualization system 5. Alternatively, it is possible that the extent is determined by the visualization system 5 in dependence upon the predetermined display period of time, for example, to a specific percentage of the display period of time. Alternatively, it is possible that the extent is specified to the visualization system 5 by the operator 4. However, the general statement that applies for any prediction applies because the prediction becomes more unreliable the further into the future the extent extends.

In step S42, the visualization system 5 determines a prediction of the future curve of the minimum Min with reference to the determined minima Min, in other words with reference to the minima Min that are determined for the display period of time. The determination of the prediction can be provided in the same manner as in step S41. The difference merely resides in the fact that the basis for the determination is not the process data points 9 but rather the minima Min. In step S43, the visualization system 5 checks whether a predicted minimum Min is below the minimum value MIN. If this is the case, in step S44 the visualization system 5 then allocates a predicted secondary alarm A' to the corresponding predicted process data point 9. Otherwise, step S44 is skipped.

In step S45, the visualization system 5 determines a prediction of the future curve of the maximum Max with reference to the determined maxima Max, in other words with reference to the maxima Max that are determined for the display period of time. The determination of the prediction can also be provided here in the same manner as in step S41. The difference resides merely in the fact that the basis of the determination is not the process data points 9 but rather the maxima Max. In step S46, the visualization system 5 checks whether a predicted maximum Max exceeds the maximum value MAX. If this is the case, in step 47 the visualization system 5 likewise then allocates a predicted secondary alarm A' to the corresponding predicted process data point 9. Otherwise, step S47 is skipped.

An approach is described above in which both steps S42 to S44 as well as steps S45 to S47 are available. Embodiments are, however, likewise also possible in which only steps S42 to S44 or only steps S45 to S47 are available.

Figure 9:
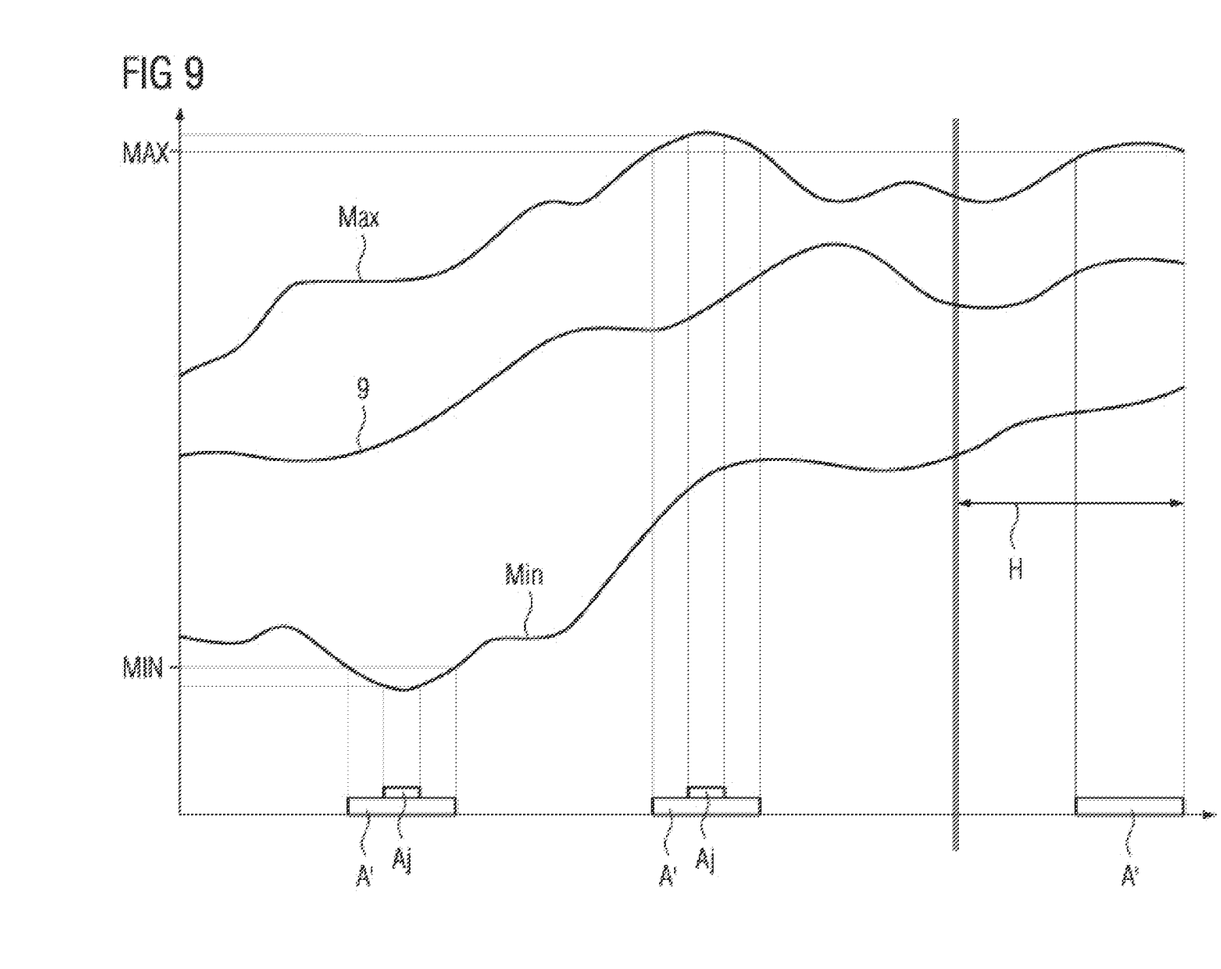
FIG. 9 shows alternative graphical plot of a temporal curve of an item of process data and a graphic.

Step S19 is not changed as such. However, within the scope of step S19, according to the illustration in FIG. 9 not merely a display of the process data points 9 is provided for the display period of time but rather also a display of the predicted process data points 9. The respective associated secondary alarms A' are also displayed for the two types of process data points 9. The display of the temporal curves of the minimum Min and the maximum Max can be provided when required and displayed as in FIG. 9 or can be hidden. When required, furthermore the associated process alarms Aj can be displayed for the display period of time. The point in time "now", in other words the present, is indicated in FIG. 9 by a vertical double line.

Figure 10:
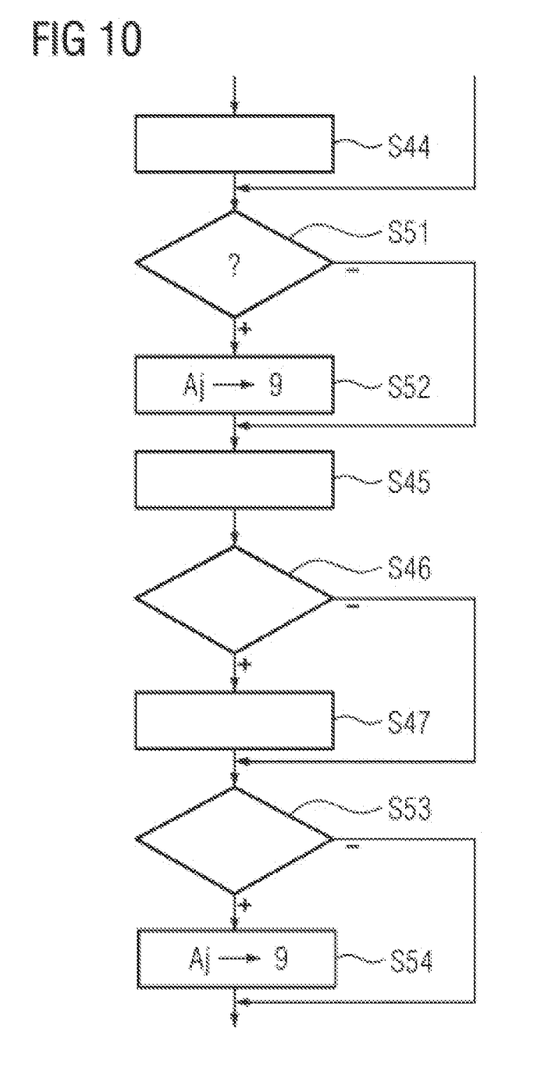
FIG. 10 shows a flow chart in accordance with another embodiment of the invention.

Provided that the associated process alarms Aj are displayed for the display period of time, the approach of FIG. 8 is preferably supplemented according to the illustration in FIG. 10. In accordance with FIG. 10, steps S42 to S44 are supplemented with steps S51 and S52 and steps S45 to S47 are supplemented with steps S53 and S54.

In step S51, the visualization system 5 checks whether a predicted minimum Min meets the triggering condition. If this is the case, in step S52 the visualization system 5 allocates a predicted process alarm Aj to the corresponding predicted process data point 9. Otherwise, step S52 is skipped.

In step S53, the visualization system 5 checks whether a predicted maximum Max meets the triggering condition. If this is the case, in step S54 the visualization system 5 likewise then allocates a predicted process alarm to the corresponding predicted process data point 9. Otherwise, step S54 is skipped.

In the event steps S51 and S52 and/or steps S53 and S54 are available, the predicted process alarms Aj are also displayed according to the illustration in FIG. 9 in addition to the actual process alarms Aj that are transmitted by the process control system 2.

The invention has been explained above in essence and furthermore explained in different advantageous embodiments. However, in its essence, the present invention relates to the following:

An industrial technical installation 1 is controlled and monitored by a process control system 2. The process control system at acquisition points in time, in each case, acquires process data x, x*, Pi and the process data x, x*, Pi that is acquired is archived as history. Owing to the selection of an item of process data x, x*, Pi and the specification of an associated display period of time by an operator 4 for this display period of time, a visualization system 5 requests the history of the selected item of process data x, x*, Pi and outputs the associated temporal curve as a graphic 8 to the operator 4. The graphic 8 comprises a number of process data points 9. The visualization system 5 determines the respective process data point 9 as a mean value or median value of the values of the selected item of process data x, x*, Pi of a respective acquisition period of time that is characteristic for the respective process data point 9. Furthermore, the visualization system also determines for the respective process data point 9 the minimum Min and/or the maximum Max of the values of the selected item of process data x, x*, Pi during the respective acquisition period of time. The visualization system 5 always then displays a secondary alarm A' together with the respective process data point 9 if the minimum Min that is determined for the respective process data point 9 is below a predetermined minimum value MIN and/or the maximum Max that is determined exceeds a predetermined maximum value MAX.

The present invention has many advantages. Initially, it is possible to display a trend in a manner which, for the operator 4, is intuitively easy to grasp and understand. Furthermore, there is an improved prediction in particular in relation to process alarms Aj and secondary alarms A' that are to be expected in the future. Proactive engagements of the operator 4 into the process sequence of the industrial technical installation 1 are facilitated. It is furthermore possible that, owing to an "unfavorable" selection of the display period of time, secondary alarms A' are not displayed that are displayed in the case of a "favorable" selection of the display period of time. This also applies for the illustration in accordance with FIG. 7, because here the determination of the secondary alarms A' is provided with reference to the minimum Min and the maximum Max even if the minimum Mini and the maximum Max are not themselves displayed.

Although the invention has been further illustrated and described in detail by the preferred exemplary embodiment, the invention is not limited in this manner by the disclosed examples and other variations can be derived therefrom by the person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A visualization method for process data by a visualization system, an industrial technical installation being controlled and monitored by a process control system, the method comprising: acquiring, by the process control system, at each acquisition point in time, process data and archiving the acquired process data as a history; Selecting an item of the process data; requesting, by the visualization system, the history of the selected item of process data and outputting an associated temporal curve as a graphic comprising a number of process data points to the at least one operator, upon the selection of an item of process data and a specification of an associated display period of time by at least one operator of the process control system for the predetermined display period of time; determining, by the visualization system, a respective process data point with reference to values of the selected item of process data of a respective acquisition period of time which is characteristic for the respective process data point, the acquisition period of time comprising a plurality of acquisition points in time and the respective process data point comprising a mean value or a median value of the process data of the respective acquisition period of time; determining, by the visualization system, at least one of a minimum and a maximum of values of the selected item of process data for the respective process data point during the respective acquisition period of time; checking, by the visualization system, whether at least one of (i) the minimum value which is determined for the respective process data point is below a predetermined minimum value and (ii) the maximum value which is determined exceeds a predetermined maximum value; and displaying, by the visualization system, a secondary alarm together with the respective process data point comprising the minimum and maximum values and the mean or median value, when one or both checks are positive, the secondary alarm representing an alarm which is not set by the process control system but rather is set by the visualization system; automatically and cyclically acquiring the process data, by the control system; and instructing the visualization system, by the control system, such that visualization system cyclically sets and displays the secondary alarm, based on the cyclically acquired process data, when the one or both checks are positive.

2. The visualization method as claimed in claim 1, wherein the process data is allocated within the process control system to a respective process object;
  wherein the process control system automatically sets each process alarm if the process data which is allocated to the respective process object meets a predetermined triggering condition;
  wherein the process control system for each process object at the acquisition points in time also detects process alarms which are currently set and archives or stores the detected process alarms with respect to a mentioned history;
  wherein the visualization system together with a history of a selected item of process data for the same display period of time also requests the history of the process alarms which are allocated to the respective process object; and
  wherein the visualization system always then displays the process data points together with the respective process data point of at least one of the process alarms if at least one process alarm occurs during the acquisition period of time that is allocated to the respective process data point.

3. The visualization method as claimed in claim 2, wherein if the predetermined display period of time includes the present, the visualization system always then determines a prediction of the future curve of the process data points with reference to the determined process data points for a prediction horizon that reaches from the present into the future and, in this case, for the prediction horizon the visualization system furthermore also determines at least one of (i) a prediction of the future curve of the minimum with reference to the determined minima and (ii) a prediction of a future curve of the maximum with reference to the determined maxima; and
  wherein the visualization system always then displays a predicted secondary alarm together with the respective predicted process data point if at least one of (i) a respective predicted minimum is below the predetermined minimum value and (ii) a respective predicted maximum exceeds the predetermined maximum value.

4. The visualization method as claimed in claim 3, wherein the visualization system furthermore always then displays a predicted process alarm together with the respective predicted process data point if at least one of (i) the respective predicted minimum and (ii) the respective predicted maximum meets the predetermined triggering condition.

5. A non-transitory computer-readable medium encoded with a computer program for a visualization system, the computer program comprising machine code processed by the visualization system; wherein, upon processing the machine code with a selection of an item of process data and specification of an associated display period of time by at least one operator of a process control system which controls and monitors an industrial technical installation and which acquires the item of process data at each acquisition point in time and archives each item of process data as a history for the predetermined display period of time, the visualization system requests the history of the selected item of process data and outputs the associated temporal curve as a graphic comprising a number of process data points to the at least one operator, wherein, upon processing the machine code, the visualization system determines the respective process data point with reference to values of the selected item of process data of a respective acquisition period of time which is characteristic for the respective process data point, the respective process data point comprising a mean value or a median value of the process data of the respective acquisition period of time; wherein, upon processing the machine code, the visualization system also determines at least one of a minimum value and a maximum value of values of the selected item of process data for the respective process data point during the respective acquisition period of time; and wherein, upon processing the machine code, the visualization system always then displays a secondary alarm together with the respective process data point comprising the minimum and maximum values and the mean or median value if at least one of (i) the minimum value which is determined for the respective data point is below a predetermined minimum value and (ii) the determined maximum value exceeds a predetermined maximum value, the secondary alarm representing an alarm which is not set by the process control system but rather is set by the visualization system;
  wherein the control system, automatically and cyclically acquires the process data; and wherein the visualization system is instructed by the control system, such that visualization system cyclically sets and displays the secondary alarm, based on the process data, when the one or both checks are positive.

6. The non-transitory computer-readable medium as claimed in claim 5, wherein the process data is allocated within the process control system to a respective process object;
  wherein the process control system in each case automatically sets a process alarm if the process data which is allocated to the respective process object meets a predetermined triggering condition;
  wherein the process control system additionally detects the process alarms that are currently set and archives or stores the detected process alarms as the history for each process object at the acquisition points in time; and
  wherein, upon processing the machine code, the visualization system together with the history of the selected item of process data for the same display period of time also requests the history of the process alarms which are allocated to the respective process object and together with the respective process data points of at least one of the process alarms always then displays the process data points if at least one process alarm occurs during the acquisition period of time that is allocated to the respective process data point.

7. The non-transitory computer-readable medium claimed in claim 6, wherein, upon processing of the machine code, the visualization system always then determines a prediction of the future curve of the process data points with reference to the determined process data points for a prediction horizon which reaches from the present into the future if the predetermined display period of time includes the present;
  wherein the visualization system furthermore also determines at least one of (i) a prediction of the future curve of the minimum value with reference to the determined minima and (ii) a prediction of the future curve of the maximum value with reference to the determined maxima for the prediction horizon; and
  wherein the visualization system always then displays a predicted secondary alarm together with the respective predicted process data point if at least one of (i) a respective predicted minimum is below the predetermined minimum and (ii) a respective predicted maximum exceeds the predetermined maximum.

8. The non-transitory computer-readable medium as claimed in claim 7, wherein the visualization system always then displays a predicted process alarm together with the respective predicted process data point if at least one of the respective predicted minimum and the respective predicted maximum meets the predetermined triggering condition.

9. A visualization system, comprising: a processor; and memory; wherein the visualization system is configured, during operation, to: acquire at each acquisition point in time, process data and archive the acquired process data as a history; select an item of the process data; request the history of the selected item of process data and output an associated temporal curve as a graphic comprising a number of process data points to the at least one operator, upon the selection of an item of process data and a specification of an associated display period of time by at least one operator of the process control system for the predetermined display period of time; determine a respective process data point with reference to values of the selected item of process data of a respective acquisition period of time which is characteristic for the respective process data point, the acquisition period of time comprising a plurality of acquisition points in time and the respective process data point comprising a mean value or a median value of the process data of the respective acquisition period of time; determine at least one of a minimum and a maximum of values of the selected item of process data for the respective process data point during the respective acquisition period of time; check whether at least one of (i) the minimum value which is determined for the respective process data point is below a predetermined minimum value and (ii) the maximum value which is determined exceeds a predetermined maximum value; and display a secondary alarm together with the respective process data point comprising the minimum and maximum values and the mean value or the median value, when one or both checks are positive, the secondary alarm representing an alarm which is not set by the process control system but rather is set by the visualization system;

wherein the control system, automatically and cyclically acquires the process data; and wherein the visualization system is instructed by the control system, such that visualization system cyclically sets and displays the secondary alarm, based on the process data, when the one or both checks are positive.

* * * * *